US011161930B2

(12) United States Patent
Burckhardt et al.

(10) Patent No.: US 11,161,930 B2
(45) Date of Patent: Nov. 2, 2021

(54) TWO COMPONENT POLYURETHANE COMPOSITION

(71) Applicant: SIKA TECHNOLOGY AG, Baar (CH)

(72) Inventors: Urs Burckhardt, Zürich (CH); Andreas Kramer, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 37 days.

(21) Appl. No.: 15/776,652

(22) PCT Filed: Dec. 20, 2016

(86) PCT No.: PCT/EP2016/081986
§ 371 (c)(1),
(2) Date: May 16, 2018

(87) PCT Pub. No.: WO2017/108832
PCT Pub. Date: Jun. 29, 2017

(65) Prior Publication Data
US 2018/0371148 A1    Dec. 27, 2018

(30) Foreign Application Priority Data

Dec. 21, 2015 (EP) .................................. 15201651

(51) Int. Cl.
| | | |
|---|---|---|
| *C08G 18/38* | (2006.01) | |
| *C08G 18/66* | (2006.01) | |
| *C08G 18/76* | (2006.01) | |
| *C08G 18/79* | (2006.01) | |
| *C09D 175/04* | (2006.01) | |
| *C08G 18/32* | (2006.01) | |
| *C09J 175/04* | (2006.01) | |
| *C08G 18/48* | (2006.01) | |
| *C08G 18/12* | (2006.01) | |
| *C08G 18/22* | (2006.01) | |
| *C09K 3/10* | (2006.01) | |

(52) U.S. Cl.
CPC ......... *C08G 18/3819* (2013.01); *C08G 18/12* (2013.01); *C08G 18/222* (2013.01); *C08G 18/324* (2013.01); *C08G 18/3206* (2013.01); *C08G 18/3256* (2013.01); *C08G 18/4808* (2013.01); *C08G 18/4825* (2013.01); *C08G 18/4829* (2013.01); *C08G 18/4841* (2013.01); *C08G 18/6674* (2013.01); *C08G 18/7671* (2013.01); *C08G 18/797* (2013.01); *C09D 175/04* (2013.01); *C09J 175/04* (2013.01); *C09K 3/1021* (2013.01); *C08G 2190/00* (2013.01)

(58) Field of Classification Search
CPC ............ C08G 18/3819; C08G 18/6674; C08G 18/7671; C08G 18/797; C08G 18/3206; C08G 18/4825; C08G 18/12; C08G 18/3256; C08G 18/222; C08G 18/4808; C08G 18/324; C08G 18/4841; C08G 18/4829; C08G 2190/00; C09D 175/04; C09J 175/04; C09K 3/1021
See application file for complete search history.

(56) References Cited

U.S. PATENT DOCUMENTS

| 8,430,989 | B2* | 4/2013 | Burckhardt | ........... C07C 251/08 156/325 |
|---|---|---|---|---|
| 2010/0130674 | A1* | 5/2010 | Burckhardt | ............ C08G 18/10 524/589 |
| 2010/0190014 | A1 | 7/2010 | Burckhardt | |
| 2015/0111991 | A1* | 4/2015 | Kitamura | ............... C07C 47/542 523/400 |
| 2018/0327535 | A1* | 11/2018 | Burckhardt | ........ C08G 18/4825 |

FOREIGN PATENT DOCUMENTS

| EP | 1 524 282 | A1 | 4/2005 |
|---|---|---|---|
| EP | 2 706 073 | A1 | 3/2014 |
| EP | 2 857 378 | A1 | 4/2015 |
| WO | 00/64860 | A1 | 11/2000 |
| WO | WO 2013/179915 | * | 12/2013 |

OTHER PUBLICATIONS

Jun. 26, 2018 International Preliminary Report on Patentability issued in Patent Application No. PCT/EP2016/081986.
Oct. 11, 2019 European Office Action issued in European Patent Application No. 16812772.8.
Mar. 16, 2017 International Search Report issued in International Patent Application No. PCT/EP2016/081986.
Jul. 30, 2020 Office Action issued in European Patent Application No. 16812772.8.

* cited by examiner

*Primary Examiner* — Patrick D Niland
(74) *Attorney, Agent, or Firm* — Oliff PLC

(57) ABSTRACT

The present invention relates to a composition comprising a first component containing at least one polyol, and a second component containing at least one polyisocyanate, the composition further comprising at least one aldimine of formula (I). The composition exhibits a long open time and fast curing without odor immissions, wherein a bubble-free, elastic material having a non-tacky surface and good strength, extensibility, elasticity and resistance is produced, which does not tend to problems arising with plasticizer migration.

20 Claims, No Drawings

TWO COMPONENT POLYURETHANE COMPOSITION

TECHNICAL FIELD

The invention relates to aldimines and polyurethanes, and to adhesives, sealants and coatings.

PRIOR ART

Curable polyurethane compositions are in wide use, for uses including elastic bonds, seals and coatings. By comparison with one-component systems, two-component systems offer the advantage of rapidly building up strength and of covering a broader spectrum of mechanical properties in terms of their use properties, from viscoelastic up to highly structural. But two-component systems consisting of a polyol component and an isocyanate component have the difficulty that the curing thereof can be considerably disrupted by moisture, which often leads to inadequate strength. Through additional use of amines in the polyol component, the systems are less prone to faults resulting from moisture in the curing, reach higher early and final strengths and show elevated stability. However, owing to the rapid reaction between amino and isocyanate groups, they often have only a short open time, which means that they are unsuitable for many applications. Systems having sufficiently long open time for manual working are generally obtained only with amines that react slowly toward isocyanates, having sterically hindered and/or electronically deactivated amino groups. In order to enable simple and solvent-free incorporation, it is also advantageous when the amine is liquid at room temperature. With these conditions, the selection is restricted to few industrially available amines which are costly and, owing to their aromatic character, toxic. Rather than free amines, it is also possible to use blocked, hydrolytically activatable amines, called latent hardeners, for example oxazolidines, ketimines or aldimines, as known from one-component polyurethane compositions. But the use thereof in two-component polyurethanes brings additional difficulties. For instance, the latent hardeners can be hydrolyzed or oligomerized during storage, especially under the influence of temperature or base, which restricts the shelf life of the compositions or formulation latitude for the individual components. In addition, the latent hardeners, in spite of the blocking of the amino groups, can still be sufficiently reactive with isocyanates as to result in a short pot life or open time and hence an undesirably short processing window. The blocking agent released from the latent hardener can lead to troublesome odor immissions on curing and/or to problems with plasticizer migration. In the case of aldimines, an additional factor is that the activation of the blocked amino groups by hydrolysis, which does not proceed spontaneously in the case of aldimino groups, and the reaction of the OH groups with isocyanates have to be matched to one another in a suitable manner in order that the curing can proceed faultlessly, especially without blistering, and the polymer formed can draw benefit from the blocked amine in relation to its strength and elasticity.

EP 1 524 282 describes two-component polyurethane compositions consisting of a first component and a second component, wherein the first component comprises at least one polyurethane prepolymer and the second component water and at least one polyaldimine. The first component here is formulated such that it cures to give an elastic material even on its own with air humidity, and the second component serves to accelerate the curing, the mechanical properties of the material formed being variable within a certain range by virtue of the polyaldimine present. The hardnesses achievable with compositions of this kind are not very high; in the examples, Shore A hardnesses around 45 are achieved. For conventional two-component polyurethane compositions having a polyol component and an isocyanate component, however, distinctly harder materials with Shore A hardnesses of 80 and higher are expected. The disclosed aldimines having substituted aryl radicals show various disadvantages. Firstly, they are highly odorous; secondly, they give rise to aldimines that are usually of high viscosity and are difficult to handle at room temperature.

EP 2 706 073 describes two-component polyurethane compositions which contain latent hardeners and cure completely and in a blister-free manner owing to the presence of specific catalysts. But the aldimines disclosed have disadvantages. The aldimines having ester groups are only of limited storage stability in the polyol component, particularly when they are exposed to basic conditions and/or temperatures elevated for a period of time. When they are hydrolyzed, ester aldehydes are released, which are odorless but lead to plasticizer migration owing to inadequate compatibility with the cured composition, which can be manifested by bleeding or substrate discoloration or stress-cracking in the substrate. The aldimines having tertiary amino groups are not odorless and result in a short open time, especially with aromatic isocyanates; the tertiary amino group, moreover, can cause blistering and tacky surfaces owing to its catalytic effect on isocyanate groups. The oxazolidines and ketimines, in turn, cause significant odor immissions on curing, some have very short open times, and they can cause stress-cracking in plastic substrates.

SUMMARY OF THE INVENTION

It is therefore an object of the present invention to provide two-component polyurethane compositions which overcome the disadvantages of the prior art. It has been found that, surprisingly, this object is achieved by a composition as described in claim 1. The components thereof are very storage-stable, especially also at elevated temperatures and also in the case that the polyol component contains aldimines of the formula (I) and water and/or basic compounds, such as amines in particular. It has a comparatively long open time, and so the composition enables seamless leveling or positioning or readjustment of the objects bonded therewith over a prolonged period after application thereof. The curing proceeds rapidly and completely, without blistering and without odor immissions. The observed combination of long open time and rapid curing is particularly surprising and is particularly advantageous for many applications. The composition cures in a blister-free manner and forms a solid material having a nontacky surface and excellent mechanical properties and high strength which does not have a tendency to lead to problems with plasticizer migration such as bleeding, substrate discoloration or stress-cracking in the substrate.

The aldehyde released from the aldimine on curing is odorless and largely nonvolatile, remains for the most part in the cured composition, has very good compatibility therewith and has barely any tendency to plasticizer migration.

The low tendency to plasticizer migration is surprising. Aldimines having elimination products of high molecular weight are naturally particularly critical in relation to plasticizer migration after curing, since the amount used is correspondingly high owing to the high equivalent weight, and hence a large amount of aldehyde released remains in the cured material. Moreover, the long-chain hydrophobic substituent, especially given branched structure, would be expected to have comparatively poor compatibility in the hydrophilic polymer skeleton of polyurethanes having hydrogen bonds.

By comparison with compositions comprising long-chain ester aldimines as known from the prior art, the composition of the invention has better storage stability, cures much more quickly with a similar open time, has better mechanical properties in the cured state, especially higher strength and extensibility, and has less of a tendency to problems with plasticizer migration. Further aspects of the invention are the subject of further independent claims. Particularly preferred embodiments of the invention are the subject of the dependent claims.

Ways of Executing the Invention

The invention provides a composition comprising
a first component comprising at least one polyol, and
a second component comprising at least one polyisocyanate,
wherein the composition further comprises at least one aldimine of the formula (I)
where

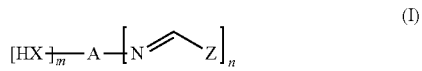

m is 0 or 1 and n is an integer from 1 to 4, where (m+n) is 2 or 3 or 4,

Z is an aryl radical substituted by an alkyl or alkoxy group and having a total of 12 to 26 carbon atoms, and A is an (m+n)-valent aliphatic, cycloaliphatic or arylaliphatic hydrocarbyl radical optionally containing ether oxygen or amine nitrogen and having a molecular weight in the range from 28 to 6,000 g/mol, and X is O or S or $NR^0$ where $R^0$ is a hydrogen radical or is a hydrocarbyl radical which has 1 to 30 carbon atoms and optionally has at least one carboxylic ester, nitrile, nitro, phosphonic ester, sulfone or sulfonic ester group or aldimino group of the formula

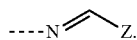

A dotted line in the formulae in each case represents the bond between a substituent and the corresponding molecular radical.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

Substance names beginning with "poly", such as polyamine, polyol or polyisocyanate, refer to substances containing, in a formal sense, two or more of the functional groups that occur in their name per molecule.

A "primary polyamine" refers to a compound having at least two primary amino groups.

A "primary hydroxyl group" refers to a hydroxyl group bonded to a $CH_2$ unit.

An "aromatic isocyanate" refers to an isocyanate wherein the isocyanate groups are bonded directly to an aromatic carbon atom. Accordingly, isocyanate groups of this kind are referred to as "aromatic isocyanate groups". "Molecular weight" refers to the molar mass (in g/mol) of a molecule or a molecule residue. "Average molecular weight" refers to the number-average molecular weight ($M_n$) of a polydisperse mixture of oligomeric or polymeric molecules or molecule residues. It is typically determined by means of gel permeation chromatography (GPC) against polystyrene as standard. The term "viscosity" refers to the dynamic viscosity or shear viscosity which is determined by the ratio between the shear stress and the shear rate (speed gradient) and is determined as described in DIN EN ISO 3219.

A substance or composition is referred to as "storage-stable" or "storable" when it can be stored at room temperature in a suitable container over a prolonged period, typically over at least 3 months up to 6 months or more, without any change in its application or use properties to a degree of relevance for the use thereof as a result of the storage.

"Room temperature" refers to a temperature of 23° C.

The two components of the composition are produced separately from one another and stored in separate moisture-tight containers until they are mixed with one another for application shortly before or during the application, and the composition ultimately cures.

The composition further comprises at least one aldimine of the formula (I). The aldimine of the formula (I) may be present in the first component and/or in the second component.

The aldimine of the formula (I) is preferably an ingredient of the first component.

This is the case especially if the aldimine of the formula (I) is an aldimine of the formula (I) with m=1.

Z is preferably a radical of the formula (II)

where R is a linear or branched alkyl or alkoxy radical having 6 to 20, preferably 8 to 16, carbon atoms.

R is preferably a linear or branched alkyl radical having 10 to 14 carbon atoms or a linear or branched alkoxy radical having 8 to 12 carbon atoms.

R is especially a linear or branched alkyl radical having 10 to 14 carbon atoms. An aldimine of this kind is particularly reactive.

R is more preferably a branched alkyl radical. An aldimine of this kind is typically liquid and of comparatively low viscosity at room temperature, which is advantageous for handling thereof.

R is most preferably a branched alkyl radical having 10 to 14 carbon atoms. An aldimine of this kind is particularly reactive and is usually liquid and of comparatively low viscosity at room temperature.

Preferably, R is in the meta or para position, especially in the para position. An aldimine of this kind is obtainable particularly readily.

Most preferably, R is a radical of the formula

where R¹ and R² are each an alkyl radical and together have 9 to 13 carbon atoms. Preferably, the R¹ and R² radicals are each linear.

Most preferably, Z is thus a radical of the formula (IIa)

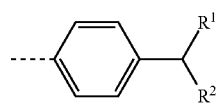

where R¹ and R² have the definitions given.

The preferred Z radicals are obtainable particularly readily and enable particularly low-odor aldimines which are especially liquid and particularly of low viscosity at room temperature.

Preferably, (m+n) is 2 or 3. n is preferably 1 or 2 or 3.

In a preferred embodiment, m is 0 and n is 2 or 3. These aldimines do not react with isocyanates in the absence of moisture.

In such an aldimine of the formula (I), A is preferably
either a di- or trivalent aliphatic or cycloaliphatic hydrocarbyl radical having a molecular weight in the range from 28 to 500 g/mol.
or a di- or trivalent polyoxyalkylene radical having an average molecular weight in the range from 170 to 6,000 g/mol.

A here is more preferably selected from the group consisting of 1,2-ethylene, 1,2-propylene, 1,3-propylene, 1,4-butylene, 1,3-pentylene, 1,5-pentylene, 2-methyl-1,5-pentylene, 1,6-hexylene, 2,2(4),4-trimethyl-1,6-hexamethylene, 1,8-octylene, 1,10-decylene, 1,12-dodecylene, 1,2-cyclohexylene, 1,3-cyclohexylene, 1,4-cyclohexylene, (1,5,5-trimethylcyclohexan-1-yl)methane-1,3,4(2)-methyl-1,3-cyclohexylene, 1,3-cyclohexylenebis(methylene), 1,4-cyclohexylenebis(methylene), methylenedicyclohexan-4-yl, methylenebis(2-methylcyclohexan-4-yl), (bicyclo[2.2.1]heptane-2,5(2,6)-diadimethylene, (tricyclo[5.2.1.0$^{2,6}$]decane-3(4),8(9)-diyl)dimethylene, 1,3-phenylenebis(methylene), 1,4-phenylenebis(methylene), 3-oxa-1,5-pentylene, 3,6-dioxa-1,8-octylene, 4,7-dioxa-1,10-decylene, α,ω-polyoxypropylene having an average molecular weight in the range from 170 to 2,000 g/mol and trimethylolpropane- or glycerol-started tris(ω-polyoxypropylene) having an average molecular weight in the range from 330 to 5,000 g/mol.

Among these, preference is given to 2-methyl-1,5-pentylene, 1,6-hexylene, 2,2(4),4-trimethyl-1,6-hexamethylene, 1,2-cyclohexylene, (1,5,5-trimethylcyclohexan-1-yl)methane-1,3,4(2)-methyl-1,3-cyclohexylene, 1,3-cyclohexylenebis(methylene), 1,4-cyclohexylenebis(methylene), methylenedicyclohexan-4-yl, (bicyclo[2.2.1]heptane-2,5(2,6)-diAdimethylene, (tricyclo[5.2.1.0$^{2,6}$]decane-3(4),8(9)-diyl)dimethylene, 1,3-phenylenebis(methylene), 1,4-phenylenebis(methylene), α,ω-polyoxypropylene having an average molecular weight in the range from 170 to 2,000 g/mol or trimethylolpropane- or glycerol-started tris(ω-polyoxypropylene) having an average molecular weight in the range from 330 to 5,000 g/mol.

Particular preference is given to 1,6-hexylene, 1,3-cyclohexylenebis(methylene), 1,4-cyclohexylenebis(methylene), 1,3-phenylenebis(methylene) or 1,4-phenylenebis(methylene). These aldimines of the formula (I) enable particularly rapid curing.

Among these, particular preference is further given to 1,2-cyclohexylene, methylenedicyclohexan-4-yl, (1,5,5-trimethylcyclohexan-1-yl)methane-1,3, (bicyclo[2.2.1]heptane-2,5(2,6)-diAdimethylene or (tricyclo[5.2.1.0$^{2,6}$]decane-3(4),8(9)-diAdimethylene. These aldimines of the formula (I) enable particularly high strengths, especially in combination with IPDI or with polyisocyanates derived from IPDI.

Among these, particular preference is further given to α,ω-polyoxypropylene having an average molecular weight in the range from 170 to 500 g/mol or trimethylolpropane- or glycerol-started tris(ω-polyoxypropylene) having an average molecular weight in the range from 330 to 500 g/mol. These aldimines of the formula (I) enable particularly high elongations.

In a further preferred embodiment, m is 1 and n is 1. The aldimines have a reactive group HX which can enter into addition reactions with isocyanates.

Such an aldimine of formula (I) is optionally in equilibrium with a cyclic compound of the formula (I')

where X, A and Z have the definitions already given. Compounds of the formula (I') are observed especially in the case that the aldimino group and the HX group in the aldimine of the formula (I) are separated by two or three carbon atoms; in this case they are 2-substituted 1,3-oxazolidines (5-membered ring) or tetrahydro-1,3-oxazines (6-membered ring).

In an aldimine of the formula (I) with m=1 and n=1, A is preferably a divalent aliphatic or cycloaliphatic or arylaliphatic hydrocarbyl radical optionally containing ether oxygen or amine nitrogen and having a molecular weight in the range from 28 to 500 g/mol.

A is more preferably selected from the group consisting of 1,2-ethylene, 1,2-propylene, 1,3-propylene, 1,5-pentylene, 1,6-hexylene, (1,5,5-trimethylcyclohexan-1-yl)methane-1,3 and 3-oxa-1,5-pentylene.

Among these, preference is given to 1,2-ethylene, 1,3-propylene, 1,6-hexylene, (1,5,5-trimethylcyclohexan-1-yl)methane-1,3 or 3-oxa-1,5-pentylene.

Preferably, X is O or NR⁰.

Preferably, R⁰ is a hydrogen radical or a monovalent hydrocarbyl radical having 1 to 18, especially 1 to 12, carbon atoms, or is

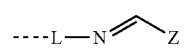

where L is an alkyl radical having 1 to 6 carbon atoms, especially ethylene, 1,3-propylene or 1,6-hexylene.

More preferably, R⁰ is a monovalent hydrocarbyl radical having 1 to 12 carbon atoms or is especially

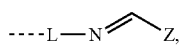

or methyl, ethyl, cyclohexyl or benzyl.

If X is O, A is especially (1,5,5-trimethylcyclohexan-1-yl)methane-1,3 or 3-oxa-1,5-pentylene.

If X is $NR^O$, A is especially ethylene and $R^O$

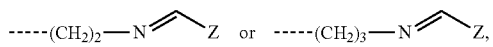

or A is 1,3-propylene and $R^O$ is

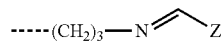

or methyl, ethyl or cyclohexyl, or A is 1,6-hexylene and $R^O$ is

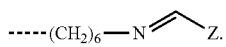

The preferred aldimines of the formula (I) are obtainable particularly readily and enable compositions having particularly good storage stability, workability and/or mechanical properties.

The aldimine of the formula (I) is preferably obtained from the reaction of at least one amine of the formula (III) with at least one aldehyde of the formula (IV) in a condensation reaction with release of water.

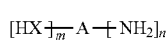

In the formulae (III) and (IV), m, n, X, A and Z have the definitions already given.

The aldehyde of the formula (IV) is preferably used here stoichiometrically or in a stoichiometric excess in relation to the primary amino groups. In this manner, the reaction product is largely or entirely free of primary amino groups.

The aldimine of the formula (I) is preferably used in the form of a reaction product from this reaction, where the aldehyde was present stoichiometrically or in a stoichiometric excess in relation to the primary amino groups.

The reaction is advantageously conducted at a temperature in the range from 15 to 120° C., preferably at 20 to 100° C., optionally in the presence of a solvent. The water of condensation is preferably removed from the reaction mixture, either as an azeotrope with a suitable solvent or preferably directly by distillation, optionally under reduced pressure.

Optionally, a catalyst is used in the reaction, especially an acid catalyst. Particular preference is given to working without solvent and removing the water of condensation from the heated reaction mixture by means of application of reduced pressure.

A reaction product of this kind can be used without further workup as aldimine of the formula (I) in the composition.

Preferably, the amine of the formula (III) is combined with the aldehyde of the formula (IV) to give a reaction mixture, where the aldehyde is present stoichiometrically or in a stoichiometric excess in relation to the primary amino groups, and the water of condensation is removed from the reaction mixture by a suitable method, optionally while heating the reaction mixture.

Suitable amines of the formula (III) are primary aliphatic, cycloaliphatic or arylaliphatic polyamines, especially 1,2-ethanediamine, 1,2-propanediamine, 1,3-propanediamine, 1,4-butanediamine, 1,3-butanediamine, 2-methyl-1,2-propanediamine, 1,3-pentanediamine, 1,5-pentanediamine, 2,2-dimethyl-1,3-propanediamine, 1,6-hexanediamine, 1,5-diamino-2-methylpentane, 1,3,6-triaminohexane, 1,7-heptanediamine, 1,8-octanediamine, 1,4,8-triaminooctane, 2,5-dimethyl-1,6-hexanediamine, 1,9-nonanediamine, 2,2(4),4-trimethyl-1,6-hexanediamine, 4-aminomethyl-1,8-octanediamine, 5-aminomethyl-1,8-octanediamine, 1,10-decanediamine, 1,11-undecanediamine, 1,6,11-triaminoundecane, 2-butyl-2-ethyl-1,5-pentanediamine, 1,12-dodecanediamine, 1,2-cyclohexanediamine, 1,3-cyclohexanediamine, 1,4-cyclohexanediamine, 1,3,5-triaminocyclohexane, 1-amino-3-aminomethyl-3,5,5-trimethylcyclohexane, 4(2)-methyl-1,3-cyclohexanediamine, 1,3-bis(aminomethyl)cyclohexane, 1,4-bis(aminomethyl)cyclohexane, 1,3,5-tris(aminomethyl)cyclohexane, bis(4-aminocyclohexyl)methane, bis(4-amino-3-methylcyclohexyl)methane, bis(4-amino-3-ethylcyclohexyl)methane, bis(4-amino-3,5-dimethylcyclohexyl)methane, bis(4-amino-3-ethyl-5-methylcyclohexyl)methane, 2,5(2,6)-bis(aminomethyl)bicyclo[2.2.1]heptane, 3(4),8(9)-bis(aminomethyl)tricyclo[5.2.1.0$^{2,6}$]decane, 1,3-bis(aminomethyl)benzene, 1,4-bis(aminomethyl)benzene, 1,3,5-tris(aminomethyl)benzene, 3-oxa-1,5-pentanediamine, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine, α,ω-polyoxypropylenediamine having an average molecular weight in the range from 200 to 4,000 g/mol, especially the Jeffamine® products D-230, D-400, XTJ-582, D-2000, XTJ-578, D-4000 (all from Huntsman), α,ω-polyoxypropylenepolyoxyethylenediamine, especially the Jeffamine® products ED-600, ED-900, ED-2003, HK-511 (all from Huntsman), α,ω-polyoxypropylenepolyoxy-1,4-butylenediamine, especially the Jeffamine® products THF-100, THF-140, THF-230, XTJ-533 or XTJ-536 (all from Huntsman), α,ω-polyoxypropylenepolyoxy-1,2-butylenediamine, especially the Jeffamine® products XTJ-568 or XTJ-569 (both from Huntsman), α,ω-polyoxy-1,2-butylenediamine, especially Jeffamine® XTJ-523 (from Huntsman), trimethylolpropane- or glycerol-started tris(ω-polyoxypropyleneamine) having an average molecular weight in the range from 380 to 6,000 g/mol, especially the Jeffamine® products T-403, T-3000 or T-5000 (all from Huntsman), trimethylolpropane-started tris(ω-polyoxypropylenepolyoxy-1,2-butyleneamine), especially Jeffamine® XTJ-566 (from Huntsman), N,N'-bis(aminopropyl)piperazine, N,N-bis(3-aminopropyl)methylamine, N,N-bis(3-aminopropyl)ethylamine, N,N-bis(3-aminopropyl)propylamine, N,N-bis(3-aminopropyl)cyclohexylamine, N,N-bis(3-aminopropyl)-2-ethylhexylamine, tris(2-aminoethyl)amine, tris(2- aminopropyl)amine, tris(3-aminopropyl)amine, or a product from the double cyanoethylation and subsequent reduction of fatty amines which is derived from a natural fatty acid, such as, in particular, N,N-bis(3-aminopropyl)cocalkylamine or N,N-bis(3-aminopropyl)tallowalkylamine, obtainable respectively as Triameen® Y12D and Triameen® YT (from Akzo Nobel). Among these, preference is given to 1,2-ethanediamine, 1,2-propanediamine, 1,3-propanediamine, 1,4-butanediamine, 1,3-pentanediamine, 1,5-pentanediamine, 1,5-diamino-2-methylpentane, 1,6-hexanediamine, 2,2(4),4-trimethyl-1,6-hexanediamine, 1,8-octanediamine, 1,10-decanediamine, 1,12-dodecanediamine, 1,2-cyclohexanediamine, 1,3-cyclohexanediamine, 1,4-cyclohexanediamine, 1-amino-3-aminomethyl-3,5,5-trimethylcyclohexane, 4(2)-methyl-1,3-cyclohexanediamine, 1,3-bis(aminomethyl)cyclohexane, 1,4-bis(aminomethyl)cyclohexane, bis(4-aminocyclohexyl)methane, bis(4-amino-3-methylcyclohexyl)methane, 2,5(2,6)-bis(aminomethyl)bicyclo[2.2.1]heptane, 3(4),8(9)-bis(aminomethyl)tricyclo[5.2.1.0$^{2,6}$]decane, 1,3-bis(aminomethyl)benzene, 1,4-bis(aminomethyl)benzene, 3-oxa-1,5-pentanediamine, 3,6-dioxaoctane-1,8-diamine, 4,7-dioxadecane-1,10-diamine, polyoxypropylenediamine having an average molecular weight in the range from 200 to 4,000 g/mol, or trimethylolpropane- or glycerol-started polyoxypropylenetriamine having an average molecular weight in the range from 380 to 6,000 g/mol.

Preferred polyoxypropylenedi- or -triamines are the commercial products Jeffamine® D-230, Jeffamine® D-400, Jeffamine® D-2000, Jeffamine® D-4000, Jeffamine® T-403, Jeffamine® T-3000, Jeffamine® T-5000 (from Huntsman) or equivalent products from other manufacturers, especially Jeffamine® D-230, Jeffamine® D-400 or Jeffamine® T-403 or equivalent products from other manufacturers.

Among these, particular preference is given to 1,5-diamino-2-methylpentane, 1,6-hexanediamine, 2,2(4),4-trimethyl-1,6-hexanediamine, 1,2-cyclohexanediamine, 1-amino-3-aminomethyl-3,5,5-trimethylcyclohexane, 4(2)-methyl-1,3-cyclohexanediamine, 1,3-bis(aminomethyl)cyclohexane, 1,4-bis(aminomethyl)cyclohexane, bis(4-aminocyclohexyl)methane, 2,5(2,6)-bis(aminomethyl)bicyclo[2.2.1]heptane, 3(4),8(9)-bis(aminomethyl)tricyclo[5.2.1.0$^{2,6}$]decane, 1,3-bis(aminomethyl)benzene, 1,4-bis(aminomethyl)benzene, polyoxypropylenediamine having an average molecular weight in the range from 200 to 2,000 g/mol, or trimethylolpropane-or glycerol-started polyoxypropylenetriamine having an average molecular weight in the range from 380 to 5,000 g/mol.

Further suitable amines of the formula (III) are primary amines having a hydroxyl or mercapto or secondary amino group, especially 2-aminoethanol, 2-amino-1-propanol, 1-amino-2-propanol, 3-amino-1-propanol, 4-amino-1-butanol, 4-amino-2-butanol, 2-amino-2-methylpropanol, 5-amino-1-pentanol, 6-amino-1-hexanol, 7-amino-1-heptanol, 8-amino-1-octanol, 10-amino-1-decanol, 12-amino-1-dodecanol or higher homologs thereof, 4-(2-aminoethyl)-2-hydroxyethylbenzene, 3-aminomethyl-3,5,5-trimethylcyclohexanol, derivatives of glycols such as diethylene glycol, dipropylene glycol, dibutylene glycol or higher oligomers or polymers of these glycols that bear a primary amino group, especially 2-(2-aminoethoxy)ethanol, 2-(2-(2-aminoethoxy)ethoxy)ethanol or a-(2-hydroxymethylethyl)-ω-(2-aminomethylethoxy)-poly(oxy(methyl-1,2-ethanediyl), products from the single cyanoethylation and subsequent hydrogenation of glycols, especially 3-(2-hydroxyethoxy)propylamine, 3-(2-(2-hydroxyethoxy)ethoxy) propylamine, 3-(6-hydroxyhexyloxy)propylamine, mercapto amines such as, in particular, 2-aminoethanethiol, 3-aminopropanethiol, 4-amino-1-butanethiol, 6-amino-1-hexanethiol, 8-amino-1-octanethiol, 10-amino-1-decanethiol or 12-amino-1-dodecanethiol, and also N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, 4-aminomethylpiperidine, 3-(4-aminobutyl)piperidine, N-(2-aminoethyl)piperazine, N-(2-aminopropyl)piperazine, diamines from the cyanoethylation or cyanobutylation and subsequent hydrogenation of primary monoamines, such as, in particular, N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, 3-methylamino-1-pentylamine, 3-ethylamino-1-pentylamine, 3-butylamino-1-pentylamine, 3-hexylamino-1-pentylamine, 3-(2-ethylhexyl)amino-1-pentylamine, 3-dodecylamino-1-pentylamine or 3-cyclohexylamino-1-pentylamine, or fatty diamines such as N-cocoalkyl-1,3-propanediamine, N-oleyl-1,3-propanediamine, N-soyaalkyl-1,3-propanediamine, N-tallowalkyl-1,3-propanediamine or N-($C_{16-22}$-alkyl)-1,3-propanediamine, as obtainable, for example, under the Duomeen® trade name from Akzo Nobel, the products from the Michael-type addition of aliphatic primary diamines with acrylonitrile, maleic or fumaric diesters, citraconic diesters, (meth)acrylic esters, (meth)acrylamides or itaconic diesters, reacted in a molar ratio of 1:1, and also bis(hexamethylene)triamine (BHMT), diethylenetriamine (DETA), dipropylenetriamine (DPTA), N-(2-aminoethyl)-1,3-propanediamine (N3-amine), N3-(3-aminopentyl)-1,3-pentanediamine or N5-(3-amino-1-ethylpropyl)-2-methyl-1,5-pentanediamine. Among these, preference is given to 2-aminoethanol, 2-amino-1-propanol, 1-amino-2-propanol, 3-amino-1-propanol, 5-amino-1-pentanol, 6-amino-1-hexanol, 3-aminomethyl-3,5,5-trimethylcyclohexanol, 2-(2-aminoethoxy)ethanol, N-methyl-1,2-ethanediamine, N-ethyl-1,2-ethanediamine, N-butyl-1,2-ethanediamine, N-hexyl-1,2-ethanediamine, N-(2-ethylhexyl)-1,2-ethanediamine, N-cyclohexyl-1,2-ethanediamine, N-methyl-1,3-propanediamine, N-ethyl-1,3-propanediamine, N-butyl-1,3-propanediamine, N-hexyl-1,3-propanediamine, N-(2-ethylhexyl)-1,3-propanediamine, N-dodecyl-1,3-propanediamine, N-cyclohexyl-1,3-propanediamine, bis(hexamethylene)triamine, diethylenetriamine, dipropylenetriamine or N-(2-aminoethyl)-1,3-propanediamine.

Particular preference is given to 3-aminomethyl-3,5,5-trimethylcyclohexanol, 2-(2-aminoethoxy)ethanol, N-methyl-1,3-propanediamine, N-ethyl-1,3-propanediamine, N-cyclohexyl-1,3-propanediamine, bis(hexamethylene)triamine, diethylenetriamine, dipropylenetriamine or N-(2-aminoethyl)-1,3-propanediamine.

A preferred aldehyde of the formula (IV) is an aldehyde of the formula (IVa) where R has the definitions already described.

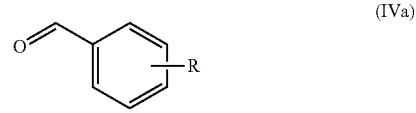

(IVa)

A particularly preferred aldehyde of the formula (IV) is an aldehyde of the formula (IVb) where $R^1$ and $R^2$ have the definitions already described.

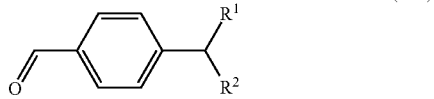

Especially preferred aldehydes of the formula (IV) are 4-decylbenzaldehydes, 4-undecylbenzaldehydes, 4-dodecylbenzaldehydes, 4-tridecylbenzaldehydes or 4-tetradecylbenzaldehydes, in which the alkyl radicals are linear or branched, especially branched.

A most preferred aldehyde of the formula (IV) is a mixture comprising 4-decylbenzaldehydes, 4-undecylbenzaldehydes, 4-dodecylbenzaldehydes, 4-tridecylbenzaldehydes or 4-tetradecylbenzaldehydes, the alkyl radicals of which are mainly branched.

More preferably, the aldimine of the formula (I) is selected from the group consisting of N,N'-bis(4-alkylbenzylidene)-2-methyl-1,5-pentanediamine, N,N'-bis(4-alkylbenzylidene)-1,6-hexanediamine, N,N'-bis(4-alkylbenzylidene)-2,2(4),4-trimethyl-1,6-hexanediamine, N,N'-bis(4-alkylbenzylidene)-1,2-cyclohexanediamine, N,N'-bis(4-alkylbenzylidene)-3-aminomethyl-3,5,5-trimethylcyclohexylamine, N,N'-bis(4-alkylbenzylidene)-4(2)-methyl-1,3-cyclohexanediamine, N,N'-bis(4-alkylbenzylidene)-1,3-bis(aminomethyl)cyclohexane, N,N'-bis(4-alkylbenzylidene)-1,4-bis(aminomethyl)cyclohexane, N,N'-bis(4-alkylbenzylidene)-bis(4-aminocyclohexyl)methane, N,N'-bis(4-alkylbenzylidene)-2,5(2,6)-bis(aminomethyl)bicyclo[2.2.1]heptane, N,N-bis(4-alkylbenzylidene)-3(4),8(9)-bis(aminomethyptricyclo[5.2.1.0$^{2,6}$]decane, N,N'-bis(4-alkylbenzylidene)-1,3-bis(aminomethyl)benzene, N,N'-bis(4-alkylbenzylidene)-1,4-bis(aminomethyl)benzene, N,N'-bis(4-alkylbenzylidene)polyoxypropylenediamine having an average molecular weight in the range from 650 to 2,500 g/mol, N,N',N''-tris(4-alkylbenzylidene)polyoxypropylenetriamine having an average molecular weight in the range from 1050 to 5,800 g/mol, N-(4-alkylbenzylidene)-3-aminomethyl-3,5,5-trimethylcyclohexanol, N-(4-alkylbenzylidene)-2-(2-aminoethoxy)ethanol, N-(4-alkylbenzylidene)-N-methyl-1,3-propanediamine, N-(4-alkylbenzylidene)-N'ethyl-1,3-propanediamine, N-(4-alkylbenzylidene)-N'-cyclohexyl-1,3-propanediamine, N,N''-bis(4-alkylbenzylidene)-N'-(2-aminoethyl)ethane-1,2-diamine, N,N''-bis(4-alkylbenzylidene)-N'-(3-aminopropyl)propane-1,3-diamine, N,N'''-bis(4-alkylbenzylidene)-N'-(2-aminoethyl)propane-1,3-diamine and N,N'''-bis(4-alkylbenzylidene)-N'-(6-aminohexyl)hexane-1,6-diamine, where alkyl in each case is a linear or particularly branched decyl, undecyl, dodecyl, tridecyl or tetradecyl radical.

Preferably, the composition comprises a mixture of aldimines of the formula (I) in which each Z is a radical of the formula (II) and R is selected from alkyl radicals having 6 to 20 carbon atoms.

More preferably, the composition comprises a mixture of aldimines of the formula (I) in which each Z is a radical of the formula (II) and R is selected from linear or particularly branched decyl, undecyl, dodecyl, tridecyl and tetradecyl radicals.

A mixture of this kind is industrially obtainable particularly easily.

In the composition, of the number of groups reactive toward isocyanate groups, preferably 1% to 70%, especially 2% to 50%, comes from aldimines of the formula (I).

The first component of the composition comprises at least one polyol. Suitable polyols are commercially available polyols, especially
polyether polyols, especially polyoxyalkylenediols and/or polyoxyalkylenetriols, especially polymerization products of ethylene oxide or 1,2-propylene oxide or 1,2- or 2,3-butylene oxide or oxetane or tetrahydrofuran or mixtures thereof, where these may have been polymerized with the aid of a starter molecule having two or more active hydrogen atoms, especially a starter molecule such as water, ammonia or a compound having multiple OH or NH groups, for example 1,2-ethanediol, 1,2- or 1,3-propanediol, neopentyl glycol, diethylene glycol, triethylene glycol, the isomeric dipropylene glycols or tripropylene glycols, the isomeric butanediols, pentanediols, hexanediols, heptanediols, octanediols, nonanediols, decanediols, undecanediols, 1,3- or 1,4-cyclohexanedimethanol, bisphenol A, hydrogenated bisphenol A, 1,1,1-trimethylolethane, 1,1,1-trimethylolpropane, glycerol or aniline, or mixtures of the aforementioned compounds. Likewise suitable are polyether polyols with polymer particles dispersed therein, especially those of acrylonitrile, styrene, a-methylstyrene, methyl(meth)acrylate or hydroxyethyl(meth)acrylate, or of polyurea or polyhydrazodicarbonamide (PHD) or of polyurethane, where the two phases form a stable, storable dispersion and the polymer may have been partially grafted onto the polyether polyol or covalently bonded to the polyether polyol. Preference is given to polyether polyols with styrene-acrylonitrile particles (SAN) or polyurea or polyhydrazodicarbonamide particles (PHD) dispersed therein.

Preferred polyether polyols are polyoxypropylenediols or polyoxypropylenetriols, or what are called ethylene oxide-terminated (EO-endcapped) polyoxypropylenediols or -triols. The latter are mixed polyoxyethylene-polyoxypropylene polyols which are especially obtained in that polyoxypropylenediols or -triols, on conclusion of the polypropoxylation reaction, are further alkoxylated with ethylene oxide and hence ultimately have primary hydroxyl groups.

Preferred polyether polyols have a degree of unsaturation of less than 0.02 meq/g, especially less than 0.01 meq/g.

Polyester polyols, especially from the polycondensation of hydroxycarboxylic acids, or especially those prepared from di- to trihydric, especially dihydric, alcohols, for example ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimer diol), neopentyl glycol hydroxypivalate, glycerol, 1,1,1-trimethylolpropane or mixtures of the aforementioned alcohols, with organic di- or tricarboxylic acids, especially dicarboxylic acids, or anhydrides or esters thereof, such as, in particular, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid or trimellitic anhydride, or mixtures of the aforementioned acids, and also polyester polyols formed from lactones such as, in particular, c-caprolactone and starters such as the aforementioned di- or trihydric alcohols. Particularly suitable polyester polyols are polyester diols.

Polycarbonate polyols as obtainable by reaction, for example, of the abovementioned alcohols—used to form the polyester polyols—with dialkyl carbonates, diaryl carbonates or phosgene.

Block copolymers bearing at least two hydroxyl groups and having at least two different blocks having polyether, polyester and/or polycarbonate structure of the type described above, especially polyether polyester polyols.

Polyacrylate polyols and polymethacrylate polyols.

Polyhydroxy-functional fats and oils, for example natural fats and oils, especially castor oil; or polyols obtained by chemical modification of natural fats and oils—called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical linkage, for example by transesterification or dimerization, of the degradation products or derivatives thereof thus obtained. Suitable degradation products of natural fats and oils are especially fatty acids and fatty alcohols, and also fatty acid esters, especially the methyl esters (FAME), which can, for example, be derivatized to hydroxy fatty acid esters by hydroformylation and hydrogenation.

Polyhydrocarbon polyols, also called oligohydrocarbonols, for example polyhydroxy-functional polyolefins, polyisobutylenes, polyisoprenes; polyhydroxy-functional ethylene-propylene, ethylene-butylene or ethylene-propylene-diene copolymers as produced, for example, by Kraton Polymers; polyhydroxy-functional polymers of dienes, especially of 1,3-butadiene, which can especially also be prepared from anionic polymerization; polyhydroxy-functional copolymers of dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers as preparable, for example, from epoxides or amino alcohols and carboxyl-terminated acrylonitrile/butadiene copolymers (commercially available, for example, under the Hypro® CTBN or CTBNX or ETBN name from Emerald Performance Materials); and hydrogenated polyhydroxy-functional polymers or copolymers of dienes.

Preferred polyols given to polyether polyols, polyester polyols, polycarbonate polyols, poly(meth)acrylate polyols or polybutadiene polyols. Particular preference is given to polyether polyols, especially polyoxypropylene polyols and/or ethylene oxide-terminated polyoxypropylene polyols. These polyols enable good mechanical properties, especially good elasticity within a wide temperature range.

Most preferred are ethylene oxide-terminated polyoxypropylene polyols. These polyols are barely hydrophilic, and their hydroxyl groups are very reactive. Preferred polyols are also polyether polyols with polymer particles dispersed therein, especially those with styrene-acrylonitrile particles (SAN) or polyurea or polyhydrazodicarbonamide particles (PHD).

The polyol preferably has an average molecular weight in the range from 400 to 10,000 g/mol, especially 500 to 6,000 g/mol.

The polyol preferably has an average OH functionality in the range from 1.6 to 3, especially 1.8 to 3, more preferably 2.2 to 3.

Preferably, the polyol has at least some primary hydroxyl groups. Such hydroxyl groups are particularly reactive with isocyanates.

The first component contains preferably 10% to 90% by weight, especially 20% to 80% by weight, of polyols.

The second component of the composition comprises at least one polyisocyanate.

Suitable polyisocyanates are especially aliphatic, cycloaliphatic or arylaliphatic di- or triisocyanates, preferably tetramethylene 1,4-diisocyanate, 2-methylpentamethylene 1,5-diisocyanate, hexamethylene 1,6-diisocyanate (HDI), 2,2,4- and/or 2,4,4-trimethylhexamethylene 1,6-diisocyanate (TMDI), decamethylene 1,10-diisocyanate, dodecamethylene 1,12-diisocyanate, lysine diisocyanate or lysine ester diisocyanate, cyclohexane 1,3- or 1,4-diisocyanate, 1-methyl-2,4- and/or -2,6-diisocyanatocyclohexane ($H_6$TDI), 1-isocyanato-3,3,5-trimethyl-5-isocyanatomethylcyclohexane (IPDI), perhydro-2,4'- and/or -4,4'-diphenylmethane diisocyanate ($H_{12}$MDI), 1,3- or 1,4-bis-diisocyanatomethyl)cyclohexane, m- or p-xylylene diisocyanate, tetramethylxylylene 1,3- or 1,4-diisocyanate, 1,3,5-tris(isocyanatomethyl)benzene, bis(1-isocyanato-1-methylethyl)naphthalene, dimer or trimer fatty acid isocyanates such as, in particular, 3,6-bis(9-isocyanatononyl)-4,5-di(1-heptenyl)cyclohexene (dimeryl diisocyanate); especially $H_{12}$MDI or HDI or IPDI;

aromatic di- or triisocyanates, preferably diphenylmethane 4,4'- or 2,4'- or 2,2'-diisocyanate or any mixtures of these isomers (MDI), toluene 2,4- or 2,6-diisocyanate or any mixtures of these isomers (TDI), mixtures of MDI and MDI homologs (polymeric MDI or PMDI), phenylene 1,3- or 1,4-diisocyanate, 2,3,5,6-tetramethyl-1,4-diisocyanatobenzene, naphthalene 1,5-diisocyanate (NDI), 3,3'-dimethyl-4,4'-diisocyanatodiphenyl (TODI), dianisidine diisocyanate (DADI), tris(4-isocyanatophenyl)methane or tris(4-isocyanatophenyl) thiophosphate; especially MDI or TDI;

oligomers or derivatives of the di- or triisocyanates mentioned, especially derived from HDI, IPDI, MDI or TDI, especially oligomers containing uretdione or isocyanurate or iminooxadiazinedione groups or various groups among these; or di- or polyfunctional derivatives containing ester or urea or urethane or biuret or allophanate or carbodiimide or uretonimine or oxadiazinetrione groups or various groups among these. In practice, polyisocyanates of this kind are typically mixtures of substances having different degrees of oligomerization and/or chemical structures. They especially have an average NCO functionality of 2.1 to 4.0.

Polyurethane polymers containing isocyanate groups from the reaction of polyols with polyisocyanates, as described hereinafter.

A suitable polyurethane polymer containing isocyanate groups is especially obtained from the reaction of at least one polyol with a superstoichiometric amount of at least one polyisocyanate, especially a diisocyanate. The reaction is preferably conducted with exclusion of moisture at a temperature in the range from 50 to 160° C., optionally in the presence of suitable catalysts. The excess of polyisocyanate is preferably chosen so as to leave, in the polyurethane polymer after the conversion of all hydroxyl groups, a content of free isocyanate groups in the range from 1% to 30% by weight, preferably 1.5% to 25% by weight, more preferably 2% to 20% by weight, based on the overall polymer. The polyurethane polymer can optionally be prepared with additional use of plasticizers or solvents, in which case the plasticizers or solvents used do not contain any groups reactive toward isocyanates.

The polyurethane polymer containing isocyanate groups preferably has a mean molecular weight in the range from 350 to 6,000 g/mol.

Preferred polyisocyanates for preparation of a polyurethane polymer containing isocyanate groups are the diisocyanates mentioned, especially MDI, TDI, IPDI, HDI or $H_{12}MDI$.

Suitable polyols are especially the polyols mentioned as an ingredient of the first component. Also especially suitable are mixtures of polyols.

Preference is given to polyether polyols, polyester polyols, polycarbonate polyols, poly(meth)acrylate polyols or polybutadiene polyols.

Particular preference is given to polyether polyols, polyester polyols, especially aliphatic polyester polyols, or polycarbonate polyols, especially aliphatic polycarbonate polyols.

Most preferred are polyether polyols, especially polyoxypropylenedi- or triols or ethylene oxide-terminated polyoxypropylenedi- or triols.

Preference is given to polyols having an average molecular weight in the range from 400 to 10,000 g/mol, especially from 500 to 6,000 g/mol.

Preference is given to polyols having an average OH functionality in the range from 1.6 to 3.

Preference is given to polyols that are liquid at room temperature.

In the preparation of a polyurethane polymer containing isocyanate groups, it is possible also to use a di- or polyfunctional alcohol such as those already mentioned.

A preferred polyisocyanate is HDI, IPDI, $H_{12}MDI$, TDI, MDI or oligomers or isocyanate-containing polyurethane polymers of these diisocyanates or mixtures thereof.

The polyisocyanate is preferably selected from the group consisting of room temperature liquid types of MDI or PMDI; isocyanate-containing polyurethane polymers based on HDI or IPDI or TDI or MDI; and oligomers of HDI or IPDI or TDI.

Preference is also given to combinations of two or more of these polyisocyanates.

A room temperature liquid type of MDI is either 4,4'-MDI liquefied by partial chemical modification—especially carbodiimidization or uretonimine formation or adduct formation with polyols—or it is a mixture of 4,4'-MDI with other MDI isomers (2,4'-MDI and/or 2,2'-MDI), and/or with MDI oligomers and/or MDI homologs (PMDI), that has been brought about selectively by blending or results from the production process.

The composition may additionally comprise further ingredients.

The first component optionally comprises further compounds reactive with isocyanates, especially di- or polyfunctional alcohols, polyphenols, polythiols, polyamines, amino alcohols or latent hardeners such as enamines, ketimines, oxazolidines or aldimines that do not conform to the formula (I).

In a preferred embodiment, the first component additionally comprises at least one chain extender in the form of a diol having two primary hydroxyl groups and a molecular weight in the range from 60 to 150 g/mol, especially 1,2-ethanediol, 1,3-propanediol, 2-methyl-1,3-propanediol, 1,4-butanediol, 1,5-pentanediol, neopentyl glycol, 1,6-hexanediol, 3-methyl-1,5-pentanediol, 1,7-heptanediol, 1,8-octanediol, 1,3-cyclohexanedimethanol, 1,4-cyclohexanedimethanol, diethylene glycol or triethylene glycol.

The diol forms what are called hard segments with the polyisocyanate in the cured material and hence enables cured compositions with particularly high strengths.

The diol is preferably selected from the group consisting of 1,2-ethanediol, 1,3-propanediol, 1,4-butanediol, 1,5-pentanediol, 1,6-hexanediol, 1,4-cyclohexanedimethanol and diethylene glycol. These diols are readily obtainable and have primary hydroxyl groups with barely any steric hindrance which are particularly reactive with isocyanate groups.

Among these, preference is given to 1,3-propanediol, 1,4-butanediol or 1,5-pentanediol. These diols are linear and thus result in particularly high strengths. Moreover, they can be handled particularly efficiently since they are barely hydrophilic and are liquid at room temperature.

Particular preference is given to 1,4-butanediol.

Preferably, the diol is present in the first component in such an amount that the ratio of the number of OH groups in the diol to the number of OH groups in the polyol is in the range from 1 to 50, preferably 2 to 20, especially 2 to 10.

The composition may comprise further di- or polyfunctional alcohols, such as, in particular, 1,2-propanediol, 1,2-butanediol, 1,3-butanediol, 1,3-pentanediol, dibromoneopentyl glycol, 1,2-hexanediol, 1,2-octanediol, 2-ethyl-1,3-hexanediol, dipropylene glycol, tripropylene glycol, ethoxylated bisphenol A, propoxylated bisphenol A, cyclohexanediol, hydrogenated bisphenol A, dimer fatty acid alcohols, 1,1,1-trimethylolethane, 1,1,1-trimethylolpropane, glycerol, pentaerythritol, sugar alcohols such as, in particular, xylitol, sorbitol or mannitol, or sugars such as, in particular, sucrose, or alkoxylated derivatives of the alcohols mentioned or mixtures of the alcohols mentioned.

In a further preferred embodiment, the first component additionally comprises at least one primary polyamine such as, in particular, 4(2)-methyl-1,3-phenylenediamine (TDA), 3,5-diethyl-2,4(6)-tolylenediamine (DETDA), 3,5-dimethylthio-2,4(6)-tolylenediamine, 4,4'-diaminodiphenylmethane (MDA), 3,3',5,5'-tetraethyl-4,4'-diaminodiphenylmethane (M-DEA), 1,5-diamino-2-methylpentane (MPMD), 2,2(4),4-trimethylhexamethylenediamine (TMD), 1,2-diaminocyclohexane, bis(4-aminocyclohexyl)methane, 1-amino-3-aminomethyl-3,5, 5-trimethylcyclohexane (=isophoronediamine or IPDA), 4(2)-methyl-1,3-cyclohexanediamine, 1,3-bis(aminomethyl)cyclohexane, 1,4-bis(aminomethyl)cyclohexane, 2, 5(2,6)-bis(aminomethyl)bicyclo[2.2.1]heptane (NBDA), 1,3-bis(aminomethyl)benzene (MXDA), 1,4-bis(aminomethyl)benzene or polyoxyalkylenepolyamines having an average molecular weight in the range from 200 to 500 g/mol, especially the Jeffamine® products D-230, D-400 or T-403 (all from Huntsman).

In the case of additional use of such a primary polyamine, it can especially directly alter the flow properties of the composition on mixing of the two components so as to give rise to a structurally viscous material that flows away or slips away to a lesser degree. This is also referred to as "in situ thixotropy".

In a further preferred embodiment, the first component additionally comprises water, especially in such an amount that the first component contains up to 2% by weight, especially up to 1% by weight, of water. The water is preferably bound to a support material. The presence of water in the composition facilitates the hydrolysis of the aldimino groups, or it proceeds substantially independently from the diffusion of water into the mixed composition applied from the environment, which results in more rapid curing. Suitable support materials are especially finely divided zeolites, aluminas, clays, chalks, cellulose or starch powder, fumed silicas or ionic polymers.

Preferably, the composition additionally comprises one or more further ingredients which are especially selected from catalysts, fillers, plasticizers and solvents.

Ingredients of this kind may be present in the first component or in the second component or in both components.

Preferably, the composition comprises at least one catalyst, especially at least one catalyst for the hydrolysis of aldimino groups and/or at least one catalyst for the reaction of hydroxyl groups with isocyanate groups.

More preferably, the composition comprises both at least one catalyst for the hydrolysis of aldimino groups and at least one catalyst for the reaction of hydroxyl groups with isocyanate groups.

Suitable catalysts for the hydrolysis of the aldimino groups are especially organic acids, especially carboxylic acids such as 2-ethylhexanoic acid, lauric acid, stearic acid, isostearic acid, oleic acid, neodecanoic acid, benzoic acid, salicylic acid or 2-nitrobenzoic acid, organic carboxylic anhydrides such as phthalic anhydride, hexahydrophthalic anhydride or methylhexahydrophthalic anhydride, silyl esters of carboxylic acids, organic sulfonic acids such as methanesulfonic acid, p-toluenesulfonic acid or 4-dodecylbenzenesulfonic acid, sulfonic esters, other organic or inorganic acids, or mixtures of the aforementioned acids and acid esters. Particular preference is given to carboxylic acids, especially aromatic carboxylic acids such as benzoic acid, 2-nitrobenzoic acid or especially salicylic acid.

Suitable catalysts for the reaction of hydroxyl groups with isocyanate groups are especially organotin(IV) compounds such as, in particular, dibutyltin diacetate, dibutyltin dilaurate, dibutyltin dichloride, dibutyltin diacetylacetonate, dimethyltin dilaurate, dioctyltin diacetate, dioctyltin dilaurate or dioctyltin diacetylacetonate, compounds of iron(III), bismuth(III) or zirconium(IV), especially complexes, or nitrogen-containing compounds such as, in particular,1,4-diazabicyclo[2.2.2]octane (DABCO), 1,8-diazabicyclo[5.4.0]undec-7-ene (DBU) or 1,5-diazabicyclo[4.3.0]non-5-ene (DBN).

More particularly, the catalyst for the reaction of hydroxyl groups with isocyanate groups is selected from the group consisting of bismuth(III) complexes and zirconium(IV) complexes, where the ligands are especially selected from alkoxides, carboxylates, 1,3-diketonates, oxinate, 1,3-ketoesterates and 1,3-ketoamidates.

With a catalyst of this kind, the composition is storage-stable and possesses a long open time coupled with rapid curing, giving rise to a blister-free material having good mechanical properties.

Suitable ligands for complexes are especially
alkoxides, especially methoxide, ethoxide, propoxide, isopropoxide, butoxide, tert-butoxide, isobutoxide, pentoxide, neopentoxide, hexoxide or octoxide;
carboxylates, especially formate, acetate, propionate, butanoate, isobutanoate, pentanoate, hexanoate, cyclohexanoate, heptanoate, octanoate, 2-ethylhexanoate, nonanoate, decanoate, neodecanoate, undecanoate, dodecanoate, lactate, oleate, citrate, benzoate, salicylate or phenylacetate;
1,3-diketonates, especially acetylacetonate (2,4-pentanedionate), 2,2,6,6-tetramethyl-3,5-heptanedionate, 1,3-di phenyl-1,3-propanedionate (dibenzoylmethanate), 1-phenyl-1,3-butanedionate or 2-acetylcyclohexanonate;
oxinate;
1,3-ketoesterates, especially methylacetoacetate, ethylacetoacetate, ethyl-2-methylacetoacetate, ethyl-2-ethylacetoacetate, ethyl-2-hexylacetoacetate, ethyl-2-phenylacetoacetate, propylacetoacetate, isopropylacetoacetate, butylacetoacetate, tert-butylacetoacetate, ethyl-3-oxovalerate, ethyl-3-oxohexanoate or 2-oxocyclohexanecarboxylic acid ethyl esterate; and
1,3-ketoamidates, especially N,N-diethyl-3-oxobutanamidate, N,N-dibutyl-3-oxobutanamidate, N,N-bis(2-ethylhexyl)-3-oxobutanamidate, N,N-bis(2-methoxyethyl)-3-oxobutanamidate, N,N-dibutyl-3-oxoheptanamidate, N,N-bis(2-methoxyethyl)-3-oxoheptanamidate, N,N-bis(2-ethylhexyl)-2-oxocyclopentanecarboxamidate, N,N-dibutyl-3-oxo-3-phenylpropanamidate, N,N-bis(2-methoxyethyl)-3-oxo-3-phenylpropanamidate or N-polyoxyalkylene-1,3-ketoamidates such as, in particular, acetoamidates of polyoxyalkyleneamines having one, two or three amino groups and a molecular weight up to 5000 g/mol, especially the following products available from Huntsman under the Jeffamine® trade name: SD-231, SD-401, SD-2001, ST-404, D-230, D-400, D-2000, T-403, M-600 and XTJ-581.

Particularly preferred bismuth(III) complexes are selected from the group consisting of bismuth(III) tris(acetate), bismuth(III) tris(octanoate), bismuth(III) tris(2-ethylhexanoate), bismuth(III) tris(neodecanoate), bismuth(III) bis(neodecanoate) oxinate, bismuth(III) neodecanoate bis(oxinate), bismuth(III) tris(N,N-diethyl-3-oxobutanamidate) and bismuth(III) complexes with various ligands among those mentioned.

Particularly preferred zirconium(IV) complexes are selected from the group consisting of zirconium(IV)tetrakis (acetate), zirconium(IV)tetrakis(octanoate), zirconium(IV) tetrakis(2-ethylhexanoate), zirconium(IV)tetrakis(neodecanoate), zirconium(IV)tetrakis(acetylacetonate), zirconium (IV)tetrakis(1,3-diphenylpropane-1,3-dionate), zirconium (IV)tetrakis(ethylacetoacetate), zirconium(IV)tetrakis(N,N-diethyl-3-oxobutanamidate) and zirconium(IV) complexes with various ligands among those mentioned.

Suitable fillers are especially ground or precipitated calcium carbonates, optionally coated with fatty acids, especially stearates, or barytes, quartz flours, quartz sands, dolomites, wollastonites, kaolins, calcined kaolins, sheet silicates such as mica or talc, zeolites, aluminum hydroxides, magnesium hydroxides, silicas including finely divided silicas from pyrolysis processes, cements, gypsums, fly ashes, industrially produced carbon blacks, graphite, metal powders, for example of aluminum, copper, iron, silver or steel, PVC powders or hollow beads.

Suitable plasticizers are especially carboxylic esters such as phthalates, especially diisononyl phthalate (DINP), diisodecyl phthalate (DIDP) or di(2-propylheptyl) phthalate (DPHP), hydrogenated phthalates, especially hydrogenated diisononyl phthalate (DINCH), terephthalates, especially dioctyl terephthalate, trimellitates, adipates, especially dioctyl adipate, azelates, sebacates, benzoates, glycol ethers, glycol esters, organic phosphoric or sulfonic esters, polybutenes, polyisobutenes, or plasticizers derived from natural fats or oils, especially epoxidized soybean oil or linseed oil.

Suitable solvents are especially acetone, methyl ethyl ketone, methyl n-propyl ketone, diisobutyl ketone, methyl isobutyl ketone, methyl n-amyl ketone, methyl isoamyl ketone, acetylacetone, mesityl oxide, cyclohexanone, methylcyclohexanone, ethyl acetate, propyl acetate, butyl acetate, n-butyl propionate, diethyl malonate, 1-methoxy-2-propyl acetate, ethyl 3-ethoxypropionate, diisopropyl ether, diethyl ether, dibutyl ether, diethylene glycol diethyl ether, ethylene glycol diethyl ether, ethylene glycol monopropyl ether, ethylene glycol mono-2-ethylhexyl ether, toluene, xylene, heptane, octane, naphtha, white spirit, petroleumether or benzine, especially Solvesso™ products (from Exxon), and also methylene chloride, propylene carbonate, butyrolactone, N-methylpyrrolidone or N-ethylpyrrolidone.

The composition may comprise further additives commonly used for polyurethane compositions. More particularly, the following auxiliaries and additives may be present:

inorganic or organic pigments, especially titanium dioxide, chromium oxides or iron oxides;

fibers, especially glass fibers, carbon fibers, metal fibers, ceramic fibers, polymer fibers such as polyamide fibers or polyethylene fibers, or natural fibers such as wool, cellulose, hemp or sisal;

dyes;

desiccants, especially molecular sieve powder, calcium oxide, highly reactive isocyanates such as p-tosyl isocyanate, monomeric diisocyanates, monooxazolidines such as Incozol®2 (von Incorez) or orthoformic esters;

adhesion promoters, especially organoalkoxysilanes, especially epoxysilanes such as, in particular, 3-glycidoxypropyltrimethoxysilane or 3-glycidoxypropyltriethoxysilane, (meth)acrylosilanes, anhydridosilanes, carbamatosilanes, alkylsilanes or iminosilanes, or oligomeric forms of these silanes, or titanates;

latent hardeners or crosslinkers, especially not aldimines that conform to the formula (I) or ketimines, enamines or oxazolidines;

further catalysts which accelerate the reaction of isocyanate groups, especially salts, soaps or complexes of tin, zinc, bismuth, iron, aluminum, molybdenum, dioxomolybdenum, titanium, zirconium or potassium, especially tin(II) 2-ethylhexanoate, tin(II) neodecanoate, zinc(II) acetate, zinc(II) 2-ethylhexanoate, zinc(II) laurate, zinc(II) acetylacetonate, aluminum lactate, aluminum oleate, diisopropoxytitanium bis(ethylacetoacetate) or potassium acetate; compounds containing tertiary amino groups, especially 2,2'-dimorpholinodiethyl ether, N-ethyldiisopropylamine, N,N,N',N'-tetramethylalkylenediamines, pentamethylalkylenetriamines and higher homologs thereof, bis(N,N-diethylaminoethyl) adipate, tris(3-dimethylaminopropyl)amine, N-alkylmorpholines, N,N'-dimethylpiperazine; aromatic nitrogen compounds such as 4-dimethylaminopyridine, N-methylimidazole, N-vinylimidazole or 1,2-dimethylimidazole; organic ammonium compounds such as benzyltrimethylammonium hydroxide or alkoxylated tertiary amines; what are called "delayed action" catalysts, which are modifications of known metal or amine catalysts; and combinations of the compounds mentioned, especially of metal compounds and nitrogen-containing compounds;

rheology modifiers, especially thickeners, especially sheet silicates such as bentonites, derivatives of castor oil, hydrogenated castor oil, polyamides, polyamide waxes, polyurethanes, urea compounds, fumed silicas, cellulose ethers or hydrophobically modified polyoxyethylenes;

natural resins, fats or oils such as rosin, shellac, linseed oil, castor oil or soya oil;

nonreactive polymers, especially homo- or copolymers of unsaturated monomers, especially from the group comprising ethylene, propylene, butylene, isobutylene, isoprene, vinyl acetate or alkyl(meth)acrylates, especially polyethylenes (PE), polypropylenes (PP), polyisobutylenes, ethylene-vinyl acetate copolymers (EVA) or atactic poly-α-olefins (APAO);

flame-retardant substances, especially the aluminum hydroxide or magnesium hydroxide fillers already mentioned, and also, in particular, organic phosphoric esters such as, in particular, triethyl phosphate, tricresyl phosphate, triphenyl phosphate, diphenyl cresyl phosphate, isodecyl diphenyl phosphate, tris(1,3-dichloro-2-propyl)phosphate, tris(2-chloroethyl)phosphate, tris(2-ethylhexyl)phosphate, tris(chloroisopropyl)phosphate, tris(chloropropyl)phosphate, isopropylated triphenyl phosphate, mono-, bis-or tris(isopropylphenyl)phosphates of different degrees of isopropylation, resorcinol bis(diphenyl phosphate), bisphenol A bis (diphenyl phosphate) or ammonium polyphosphates;

additives, especially wetting agents, leveling agents, defoamers, deaerators, stabilizers against oxidation, heat, light or UV radiation, or biocides;

or further substances customarily used in polyurethane compositions. It may be advisable to chemically or physically dry certain substances before mixing them into the composition.

The first and second components of the composition are produced separately from one another. This is done by mixing the ingredients of the respective component with one another with exclusion of moisture. Each component is stored in a separate moisture-tight container. A suitable moisture-tight container especially consists of an optionally coated metal and/or plastic, and is especially a vat, a container, a hobbock, a bucket, a can, a bag, a tubular bag, a canister, a cartridge, a tube or a bottle.

For application of the composition, the two components are mixed with one another by a suitable method shortly before or during the application. The mixing ratio is preferably chosen such that the groups reactive toward isocyanates are in a suitable mixing ratio to the isocyanate groups.

The ratio of the groups reactive with isocyanates, such as, in particular, hydroxyl groups, aldimino groups and primary and secondary amino groups, to the isocyanate groups here is preferably in the range from 0.5 to 1.1, more preferably 0.7 to 1.05, especially 0.8 to 1.0, most preferably about 0.95.

In parts by weight, the mixing ratio between the first and second components is typically in the range from about 1:2 to 20:1, especially 1:1 to 10:1.

A suitable method of mixing the two components is dependent on consistency, viscosity and reactivity of the two components and on the application.

Components having good flowability can be mixed, for example, with a suitable stirrer system, for example a twin-shaft mixer, where the individual components may have been preformulated in the correct mixing ratio. It is likewise possible to mix the two components by means of a static mixer or with the aid of dynamic mixers, for example by machine by means of a two-component metering system. The mixing can be effected continuously or batchwise. In the mixing, it should be ensured that the two components are mixed with maximum homogeneity. In the event of inadequate mixing, local deviations from the advantageous mixing ratio will occur, which can result in a deterioration in the mechanical properties and/or blistering.

The mixing is preferably effected at ambient temperature, especially in the range from about 0 to 50° C., especially 10 to 40° C.

If mixing precedes the application, it is ensured that not too much time passes between the mixing of the components and the application, in order that there are no defects, for example poor leveling or slowed or incomplete buildup of adhesion to the substrate. More particularly, the open time of the composition should not be exceeded during the application.

The "open time" refers to the period of time over which the composition can be worked or reworked after the curing process has commenced.

The time until formation of a skin ("skin time") or until freedom from tack ("tack-free time") is a measure of the open time.

With the mixing of the two components, the process of curing commences. This results in the cured composition.

The curing is preferably likewise effected at ambient temperature.

In the curing, the aldimino groups of the aldimine of the formula (I) react with available isocyanate groups under the influence of moisture. The hydroxyl groups and any primary or secondary amino groups present react with further isocyanate groups. Any further isocyanate groups present react with one another under the influence of moisture. The totality of these reactions that lead to curing of the composition is also referred to as crosslinking.

The moisture required for reaction of the aldimino groups may at least partly be present in the composition, and/or it can get into the composition by diffusion from the environment, especially from the air (air humidity) or from the substrates.

The crosslinking releases an aldehyde of the formula (IV). It is substantially nonvolatile and odorless and remains for the most part in the cured composition. It behaves or acts like a plasticizer therein. As such, it can in principle itself migrate and/or affect the migration of plasticizers. The aldehyde of the formula (IV) has very good compatibility with the cured composition, barely migrates itself, and also does not trigger any enhanced migration of plasticizers.

The composition has a long open time and surprisingly rapid curing without odor immissions, giving rise to a blister-free, elastic material having a non-tacky surface and good strength, extensibility, elasticity and durability, which does not have a tendency to problems with plasticizer migration.

The composition is preferably an adhesive or a sealant or a coating. The adhesive or the sealant or the coating is preferably elastic.

The composition is especially suitable as an adhesive and/or sealant for bonding and sealing applications, especially in the construction and manufacturing industries or in motor-vehicle construction, especially for parquet bonding, installable component bonding, cavity sealing, assembly, module bonding, chassis bonding, glass bonding, join sealing or anchoring. Elastic bonds in motor vehicle construction are especially the attachment of parts such as plastic covers, decorative strips, flanges, fenders, drivers' cabins or other installable components to the painted chassis of a motor vehicle, or the bonding of glass panes into the chassis, where the motor vehicles are especially automobiles, trucks, buses, rail vehicles or ships.

The composition is especially suitable as a sealant for the elastic sealing of all kinds of joins, seams or cavities especially on joins in construction such as dilatation joins or connection joins between components.

As a coating, the composition is suitable for protection of buildings or walls, especially as coating of balconies, terraces, open spaces, bridges, parking decks, or for sealing of roofs, especially flat roofs or slightly inclined roof areas or roof gardens, or in the interior of buildings for water sealing, for example beneath tiles or ceramic plates in wet cells or kitchens, or as floorcovering in kitchens, industrial halls or fabrication spaces, or as seal in collection tanks, channels, shafts or wastewater treatment plants, or for protection of surfaces as varnish or seal, or as potting compound for cavity sealing, as seam seal or as protective coating for pipes, for example.

It can also be used for repair purposes as seal or coating, for example of leaking roof membranes or floor coverings that are no longer fit for purpose, or more particularly as repair compound for highly reactive spray seals.

The composition can be formulated such that it has a pasty consistency with structurally viscous properties. A composition of this kind is applied by means of a suitable device, for example from standard commercial cartridges or vats or hobbocks, for example in the form of a bead, which may have an essentially round or triangular cross-sectional area.

The composition can also be formulated such that it is fluid and "self-leveling" or only slightly thixotropic and can be poured out for application. As a coating, it can subsequently be distributed, for example, over an area down to the desired layer thickness, for example by means of a roller, a slide bar, a notched trowel or a palette knife. In one operation, typically a layer thickness in the range from 0.5 to 3 mm, especially 1.0 to 2.5 mm, is applied.

The coating is especially used as elastic liquid applied membrane to seal a built structure.

One minute after mixing, the composition preferably has a viscosity at 25° C. in the range from 0.5 to 2 Pa·s, preferably 0.5 to 1.5 Pas. Thus, it can be processed very efficiently as a liquid applied membrane. It is preferably self-leveling, meaning that it levels of its own accord to give an even surface after it has been worked by means of a roll, notched trowel, spiked roller or the like.

In one operation, typically a layer thickness in the range from 0.5 to 3 mm, especially 1.0 to 2.5 mm, is applied. The composition can be applied in one or more layers.

Suitable substrates which can be bonded or sealed or coated with the composition are especially
- glass, glass ceramic, concrete, mortar, fiber cement, especially fiber cement boards, brick, tile, gypsum, especially gypsum boards, or natural stone such as granite or marble;
- repair or leveling compounds based on PCC (polymer-modified cement mortar) or ECC (epoxy resin-modified cement mortar);
- metals or alloys, such as aluminum, copper, iron, steel, nonferrous metals, including surface-finished metals, or alloys such as galvanized or chromed metals;
- asphalt or bitumen;
- leather, textiles, paper, wood, woodbase materials bonded with resins such as phenolic, melamine or epoxy resins, resin-textile composites or further polymer composites;
- plastics such as rigid and flexible PVC, polycarbonate, polyester, polystyrene, polyamide, PMMA, ABS, SAN, epoxy resins, phenolic resins, PUR, POM, TPO, PE, PP, EPM or EPDM, in each case untreated or surface-treated, for example by means of plasma, corona or flames;

fiber-reinforced plastics, such as carbon fiber-reinforced plastics (CFP), glass fiber-reinforced plastics (GFP) and sheet molding compounds (SMC);

insulation foams, especially made of EPS, XPS, PUR, PIR, rockwool, glass wool or foamed glass;

coated or painted substrates, especially painted tiles, coated concrete, powder-coated metals or alloys or painted metal sheets;

paints or varnishes, especially automotive topcoats.

If required, the substrates can be pretreated prior to application, especially by chemical and/or physical cleaning methods or the application of an activator or a primer.

It is possible to bond and/or seal two identical or two different substrates.

The application and curing of the composition affords an article bonded or sealed or coated with the composition. This article may be a built structure or a part thereof, especially a built structure in civil engineering above or below ground, a bridge, a roof, a staircase or a facade, or it may be an industrial good or a consumer good, especially a window, a pipe, a rotor blade of a wind turbine, a domestic appliance or a mode of transport such as, in particular, an automobile, a bus, a truck, a rail vehicle, a ship, an aircraft or a helicopter, or an installable component thereof.

EXAMPLES

Adduced hereinafter are working examples which are intended to elucidate the invention described in detail. It will be appreciated that the invention is not restricted to these described working examples.

Aldehydes used:

Aldehyde—Fractionated reaction mixture obtained from formylation, catalyzed 1: by means of HF-BF$_3$, of C$_{10-14}$-alkylbenzene, containing mainly branched 4-(C$_{10-14}$-alkyl) benzaldehydes. (mean aldehyde equivalent weight 290 g/eq)

2,2-Dimethyl-3-lauroyloxypropanal

Aldehyde-1 is a mixture of aldehydes of the formula (IV). 2,2-Dimethyl-3-lauroyloxypropanal serves as a comparison.

Preparation of Aldimines:

The amine value (including aldimino groups) was determined by means of titration (with 0.1N HClO$_4$ in acetic acid versus crystal violet).

The viscosity was measured with a thermostated Rheotec RC30 cone-plate viscometer (cone diameter 50 mm, cone angle 1°, cone tip-plate distance 0.05 mm, shear rate 10 s$^{-1}$).

Aldimine A1:

50.00 g of aldehyde-1 were initially charged in a round-bottom flask under a nitrogen atmosphere. While stirring, 13.93 g of 3-aminomethyl-3,5,5-trimethylcyclohexylamine were added and then the volatile constituents were removed at 80° C. and a reduced pressure at 10 mbar. A light yellow, odorless and pH-neutral liquid having a viscosity at 20° C. of 21.3 Pa·s and an amine value of 150.1 mg KOH/g was obtained.

Aldimine A2:

50.00 g of aldehyde-1 were initially charged in a round-bottom flask under a nitrogen atmosphere. While stirring, 13.58 g of hexane-1,6-diamine solution (70% by weight in water) were added and then the volatile constituents were removed at 80° C. and a reduced pressure at 10 mbar. A light yellow, odorless and pH-neutral liquid having a viscosity at 20° C. of 1.0 Pa·s and an amine value of 161.6 mg KOH/g was obtained.

Aldimine A3:

50.00 g of aldehyde-1 were initially charged in a round-bottom flask under a nitrogen atmosphere. While stirring, 11.14 g of 1,3-bis(aminomethyl)benzene were added and then the volatile constituents were removed at 80° C. and a reduced pressure at 10 mbar. A pale yellow, odorless and pH-neutral liquid having a viscosity at 20° C. of 2.6 Pa·s and an amine value of 155.7 mg KOH/g was obtained.

Aldimine R1:

48.92 of 2,2-dimethyl-3-lauroyloxypropanal were initially charged in a round-bottom flask under a nitrogen atmosphere. While stirring, 13.93 g of 3-aminomethyl-3,5,5-trimethylcyclohexylamine were added and then the volatile constituents were removed at 80° C. and a reduced pressure at 10 mbar. A pale yellow, odorless liquid having an amine value of 153.0 mg KOH/g was obtained.

The aldimines A1 to A3 are aldimines of the formula (I). Aldimine R1 serves as a comparison.

Production of Two-Component Polyurethane Compositions:

Compositions Z1 to Z3 and Ref1:

For each composition, a first component component K1 was produced by processing 46.82 parts by weight (PW) of Voranol® CP 4755 (EO-endcapped polyoxypropylenetriol, OH number 35.0 mg KOH/g, from Dow)

7.61 PW of 1,4-butanediol, in each case the aldimine specified in table 1 in the amount specified, 1.87 PW of 1,3-bis(aminomethyl)benzene, 35.18 PW of calcined kaolin, 3.74 PW of Sylosiv® A3 (molecular sieve powder, from Grace), and 0.09 PW of water in a vacuum dissolver with exclusion of moisture to give a homogeneous paste, and storing it.

In addition, for each composition, a second component component K2 was prepared by processing 55.65 parts by weight (PW) of polymer-1, the preparation of which is described hereinafter, 38.51 PW of Desmodur® CD (modified diphenylmethane diisocyanate containing MDI-carbodiimide adducts, liquid at room temperature, NCO content 28% by weight, from Covestro)

5.35 PW of hydrophobically modified fumed silica, 0.43 PW of solution of 5% by weight of salicylic acid in diisopropyl phthalate, and 0.06 PW of K-Kat® A-209 (zirconium(IV) chelate complex in reactive diluent and tert-butyl acetate, from King Industries)

in a vacuum dissolver with exclusion of moisture to give a homogeneous paste, and storing it.

Polymer-1 was prepared by reacting 1300 g of Acclaim® 4200 (polyoxypropylenediol, OH number 28.5 mg KOH/g, from Covestro), 2600 g of Voranol® CP 4755 (EO-endcapped polyoxypropylenetriol, OH number 35.0 mg KOH/g, from Dow), 600 g of Desmodur® 44 MC L (4,4'-methylene diphenyl diisocyanate, from Covestro) and 500 g of diisodecyl phthalate by a known method at 80° C. to give a polyurethane polymer containing isocyanate groups and having a content of free isocyanate groups of 2.1% by weight.

For the use, the two components were processed in the specified mixing ratio K1/K2 (in parts by weight, w/w) according to table 1 by means of a SpeedMixer® (DAC 150 FV, Hauschild) for 30 seconds to give a homogeneous paste, and the latter was tested immediately as follows:

From each composition, a film of thickness 2 mm was produced and left to cure under standard climatic conditions for 7 days, and the mechanical properties of Tensile strength, Elongation at break and 5% modulus of elasticity (at 0.5-5% elongation) were tested according to DIN EN 53504 at a strain rate of 200 mm/min. These results are identified as "fresh" in table 1.

As a measure of the open time, the Tack-free time was determined. For this purpose, a few grams of the freshly mixed composition were applied to cardboard in a layer thickness of about 2 mm and, under standard climatic conditions, the time until, when the surface of the composition was gently tapped by means of an LDPE pipette, there were for the first time no residues remaining any longer on the pipette was determined. These results are identified as "fresh" in table 1.

Shore A hardness was determined according to DIN 53505 on test specimens cured under standard climatic conditions for the time specified in table 1.

In addition, Sag resistance was determined for each composition. For this purpose, 8 mL of the freshly mixed compound was applied from a commercial 10 mL plastic syringe that had been cut open at the front onto a piece of horizontal cardboard from above, and the latter was tipped immediately into a vertical position, such that the composition applied ended up horizontal. Subsequently, the extent of sagging from the horizontal position downward during the curing under standard climatic conditions was assessed, with sagging of not more than 20 mm assessed as "good", sagging of not more than 30 mm as "moderately good", and sagging of not more than 40 mm as "moderate". These results are identified as "fresh" in table 1.

Finally, the same tests were repeated for each composition, except that the first component K1 had been stored beforehand in a moisture-tight container in an air circulation oven at 60° C. for 48 hours. These results are identified as "stored" in table 1.

For all compositions, no odor was perceptible during and after curing by smelling by nose at a distance of 2 cm.

The results are reported in table 1.

Compositions Z1 to Z3 are inventive examples. Composition Ref1 is a comparative example.

Compositions Z1 to Z3 are especially suitable as elastic adhesives.

TABLE 1

| | Composition | | | |
|---|---|---|---|---|
| | Ref1 | Z1 | Z2 | Z3 |
| Aldimine | R1 | A1 | A2 | A3 |
| | 4.69 PW | 4.79 PW | 4.45 PW | 4.54 PW |
| K1/K2 mixing ratio (w/w) | 100/87 | 100/87 | 100/87 | 100/87 |
| Tack-free time | | | | |
| fresh, | 42' | 35' | 27' | 35' |
| stored | 41' | 32' | 22' | 27' |
| Sag resistance | | | | |
| fresh, | moderate | moderately good | good | good |
| stored | moderately good | good | good | good |
| Shore A fresh | | | | |
| after 3 h | 16 | 48 | 54 | 55 |
| after 1 d | 77 | 78 | 79 | 82 |
| after 3 d | 79 | 80 | 81 | 82 |
| Shore A stored | | | | |

TABLE 1-continued

| | Composition | | | |
|---|---|---|---|---|
| | Ref1 | Z1 | Z2 | Z3 |
| after 3 h | 37 | 54 | 55 | 55 |
| after 1 d | 80 | 75 | 75 | 76 |
| after 3 d | 83 | 79 | 79 | 76 |
| Mechanical properties fresh | | | | |
| Tensile strength | 2.1 MPa | 5.5 MPa | 5.0 MPa | 5.2 MPa |
| Elongation at break | 51% | 160% | 92% | 136% |
| Modulus of elasticity 5% | 16.8 MPa | 22.0 MPa | 25.0 MPa | 22.8 MPa |
| Mechanical properties stored | | | | |
| Tensile strength | 3.3 MPa | 6.0 MPa | 5.2 MPa | 5.8 MPa |
| Elongation at break | 81% | 151% | 96% | 139% |
| Modulus of elasticity 5% | 23.4 MPa | 19.9 MPa | 25.5 MPa | 22.3 MPa |

The invention claimed is:

1. A composition comprising
   (A) a first component comprising at least one polyol,
   (B) a second component comprising at least one polyisocyanate, and
   (C) at least one aldimine of the formula (I)

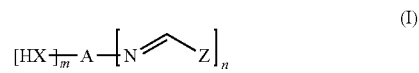

where
m is 0 or 1 and n is an integer from 1 to 4, where (m+n) is 2 or 3 or 4,
Z is an aryl radical having a total of 12 to 26 carbon atoms and the aryl radical is represented by the formula (II)

where R is a branched alkyl or alkoxy radical having 6 to 20 carbon atoms, and
A is an (m+n)-valent aliphatic, cycloaliphatic, or arylaliphatic hydrocarbyl radical optionally containing ether oxygen or amine nitrogen and having an average molecular weight in a range of from 28 to 6,000 g/mol, and
X is O or S or $NR^O$ where $R^O$ is a hydrogen radical or is a hydrocarbyl radical which has 1 to 30 carbon atoms and optionally at least one selected from the group consisting of carboxylic ester, nitrile, nitro, phosphonic ester, sulfone, sulfonic ester group, and aldimino group of the formula

2. The composition as claimed in claim 1, wherein the at least one aldimine of the formula (I) is an ingredient of the first component.

3. The composition as claimed in claim 1, wherein m is 0 and n is 2 or 3.

4. The composition as claimed in claim 3, wherein A is either a di- or trivalent aliphatic or cycloaliphatic hydrocarbyl radical having a molecular weight in a range of from 28 to 500 g/mol,
or a di- or trivalent polyoxyalkylene radical having an average molecular weight in a range of from 170 to 6,000 g/mol.

5. The composition as claimed in claim 1, wherein m is 1 and n is 1.

6. The composition as claimed in claim 5, wherein A is a divalent aliphatic or cycloaliphatic or arylaliphatic hydrocarbyl radical optionally containing ether oxygen or amine nitrogen and having an average molecular weight in a range of from 28 to 500 g/mol.

7. The composition as claimed in claim 1, wherein the composition comprises a mixture including two or more of the aldimine of the formula (I) and R is selected from the group consisting of linear or branched decyl, undecyl, dodecyl, tridecyl, and tetradecyl radicals.

8. The composition as claimed in claim 1, wherein the at least one polyol has an average molecular weight in a range of from 400 to 10,000 g/mol.

9. The composition as claimed in claim 1, wherein:
(a) the at least one polyisocyanate is at least one selected from the group consisting of room temperature liquid types of diphenylmethane 4,4'-diisocyanate, a homolog thereof, diphenylmethane 2,4'-diisocyanate, a homolog thereof, diphenylmethane 2,2'-diisocyanate, and a homolog thereof;
or
(b) the at least one polyisocyanate is at least one polyurethane polymer containing isocyanate groups and the at least one polyurethane polymer is formed from hexamethylene 1,6-diisocyanate, or 1-isocyanato-3,3,5-trimethyl-5-isocyanatomethylcyclohexane, or toluene 2,4-diisocyanate, or toluene 2,6-diisocyanate, or a mixture including toluene 2,4-diisocyanate and toluene 2,6-diisocyanate, or diphenylmethane 4,4'-diisocyanate, or diphenylmethane 2,4'-diisocyanate, or diphenylmethane 2,2'-diisocyanate;
or
(c) the at least one polyisocyanate is an oligomer of hexamethylene 1,6-diisocyanate, or 1-isocyanato-3,3,5-trimethyl-5-isocyanatomethylcyclohexane, or toluene 2,4-diisocyanate, or toluene 2,6-diisocyanate, or a mixture including toluene 2,4-diisocyanate and toluene 2,6-diisocyanate.

10. The composition as claimed in claim 1, wherein the first component further comprises at least one chain extender in the form of a diol having two primary hydroxyl groups and a molecular weight in a range of from 60 to 150 g/mol.

11. The composition as claimed in claim 1, further comprising at least one further ingredient selected from the group consisting of catalysts, fillers, plasticizers, and solvents.

12. The composition as claimed in claim 1, wherein the composition is an adhesive or a sealant or a coating.

13. A method comprising applying the composition as claimed in claim 12, in the form of a coating, as elastic liquid applied membrane to seal a built structure.

14. The composition as claimed in claim 1, wherein m is 0.

15. The composition as claimed in claim 3, wherein n is 2.

16. The composition as claimed in claim 1, wherein 1% to 70% of a number of groups reactive toward isocyanate groups comes from the at least one aldimine of the formula (I).

17. The composition as claimed in claim 1, wherein 2% to 50% of a number of groups reactive toward isocyanate groups comes from the at least one aldimine of the formula (I).

18. The composition as claimed in claim 1, wherein the at least one polyol includes a polyoxyalkylenetriol.

19. The composition as claimed in claim 1, wherein A is a divalent aliphatic or cycloaliphatic or arylaliphatic hydrocarbyl radical optionally containing ether oxygen or amine nitrogen and having an average molecular weight in a range of from 28 to 500 g/mol.

20. The composition as claimed in claim 9, wherein the at least one polyisocyanate includes the at least one polyurethane polymer.

* * * * *